Jan. 6, 1970   L. G. W. WEAVER   3,488,470
PRESSURE HEADS FOR AIRCRAFT
Filed June 28, 1967   2 Sheets-Sheet 2
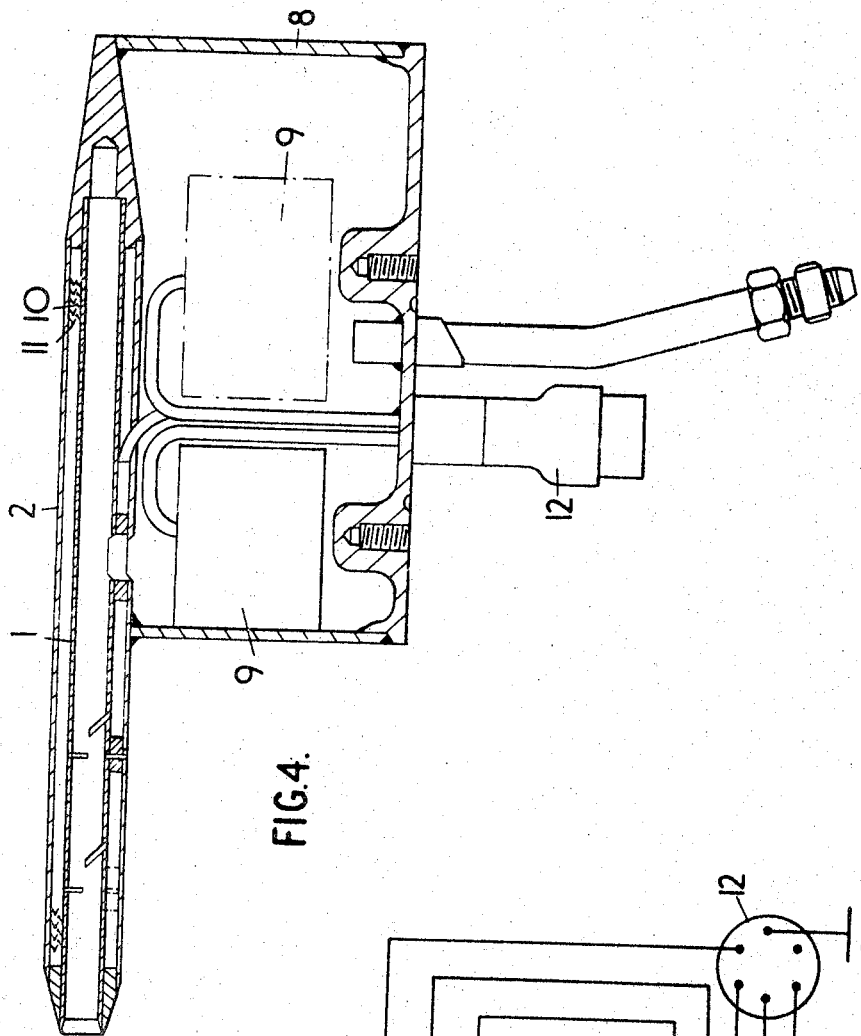
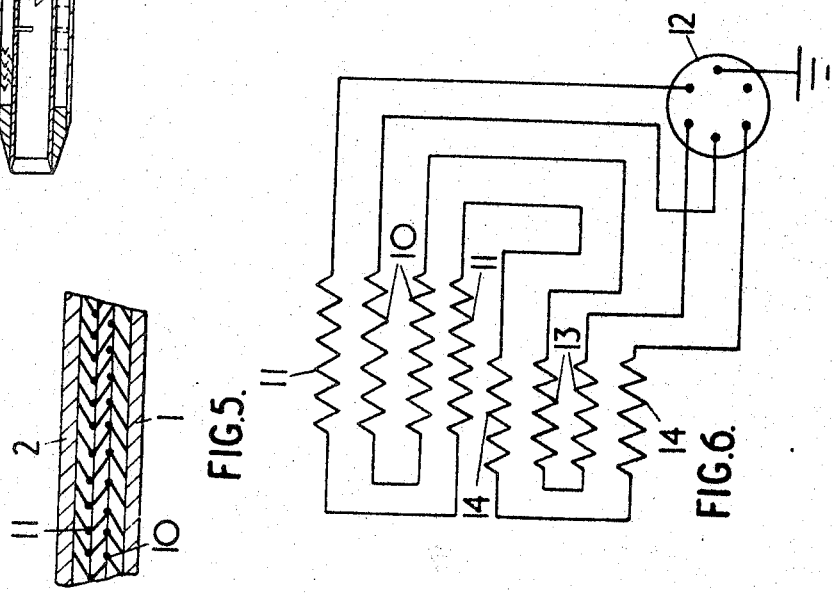

United States Patent Office 3,488,470
Patented Jan. 6, 1970

3,488,470
PRESSURE HEADS FOR AIRCRAFT
Leslie George Wheal Weaver, Taunton, Somerset, England, assignor to Avimo Limited, Taunton, Somerset, England, a British company
Filed June 28, 1967, Ser. No. 649,685
Claims priority, application Great Britain, July 6, 1966, 30,357/66
Int. Cl. H05b 1/00, 3/00, 11/00
U.S. Cl. 219—201          8 Claims

ABSTRACT OF THE DISCLOSURE

An improved heating arrangement for an aircraft pressure head, comprising a sheath of a sodium silicate composition embedded between an inner core and an outer housing of the head, and electrical heating means embedded in the sheath. The sodium silicate composition may include fillers to enhance its temperature resistance.

---

This invention relates to pressure heads for aircraft, such as airplanes and missiles.

The proper functioning of guidance systems for airplanes and missiles depends fundamentally on the accurate measurement of total and static pressures.

The sensing device for this purpose is usually a rigid tube, known as a pressure head, projected from the airframe into the air stream.

Environmental conditions demand that this pressure head has a heater for de-icing. The heater must be highly efficient and extremely reliable, but must not alter the aerodynamic characteristics of the pressure head by virtue of its size or its bulk.

There are two types of conventional heaters for pressure heads and similar instruments. One uses element wire wound on a helically grooved ceramic former and this type has the following disadvantages:

(1) Expensive tooling for the ceramic formers.
(2) Ceramic is fragile.
(3) Element vibrates within former groove and may fracture.
(4) Poor heat conduction to outer housing due to large air cavities around the former.

The other conventional heater is of the mineral insulated, metal sheathed type having the following disadvantages:

(1) High manufacturing costs.
(2) High water absorption of the mineral insulation.
(3) The metal sheath is liable to fracture during winding thus permitting moisture to enter the mineral insulation.

The present invention consists in a pressure head, comprising an outer housing and an inner core of metal which may be of high thermal conductivity, and an electrical heating element embedded in an electrically insulating sheath of a sodium silicate composition between the core and the outer housing.

Such a construction has the advantages of lightness, robustness, and comparative cheapness, and is also waterproof.

The core and outer housing are preferably of copper but may be of ferrous metal such as stainless steel.

Conveniently, the heating element is of wire and is wound helically so as to start and finish at the same end of the pressure head.

When flying in exceptionally severe conditions such as through heavy concentration of ice particles and/or super cooled water droplets, the heater may not be able to meet the demands made upon it unless the insulating material is very heat resistant and a sodium silicate composition meets this requirement.

The temperature resistance of the layer can be further raised by adding a suitable filler to the composition, such as one or more of the following: Marble flour, slate powder, sand, zircon powder, silica flour, chopped glass strands, mica flour.

Also the element wire may be coated with ceramic.

The invention will be further described with reference to the accompanying drawings, which show preferred embodiments of the invention.

In the drawings:

FIGURE 4 is a sectional view of a complete pressure head according to one form of the invention;

FIGURE 5 is an enlarged sectional view of a detail of FIGURE 4; and

FIGURE 6 is a wiring diagram of the head of FIGURES 4 and 5.

Figure 1:
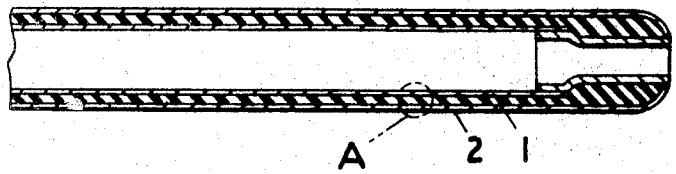
FIGURE 1 shows a section of part of a pressure head construction.
Figure 2:
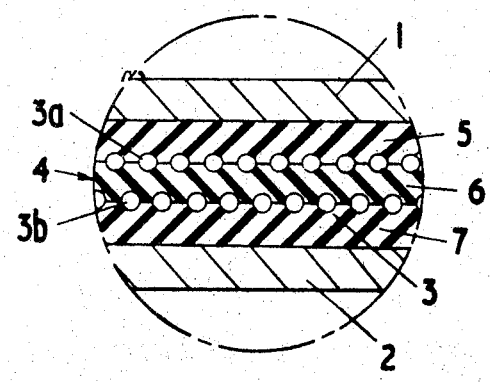
FIGURE 2 is an enlarged section showing details within the circle A of FIGURE 1.

FIGURES 1 and 2 show a high thermal conductivity copper tube core 1 and an outer housing or shell 2, also of high thermal conductivity copper tube. Between these two members a heating element 3 is embedded in a sodium silicate composition 4. The thickness of the insulation required for various operating voltages, temperatures, etc., varies between .010″ and .125″ according to the type of aircraft.

The heating element may be of wire of the type having a high temperature resistance co-efficient, thus providing automatic thermal regulation, avoiding over-heating when the element is switched on in still air.

In a preferred mode of manufacture, a layer 5 of the composition is molded on to the core tube 1. When the composition has cured, a first winding 3a of heater wire 3 is wound on to the composition. The angle of helix of the wire is adjusted during winding to provide concentrations of heat where required and to avoid locations of subsequent machining of slots and drilled holes in the tube 1.

Another layer 6 of the composition is molded over the winding 3a and when this has cured a second winding 3b is wound over the second composition layer 6, thus the element wire starts and finishes at the same end of the tube for convenience of connecting to the power supply.

Over the second element winding is molded a third layer 7 of the composition. When this has cured, the complete assembly is placed into the outer housing or shell 2, care being taken to ensure that there is no air space between the layer 7 and the bore of the housing.

Figure 3:
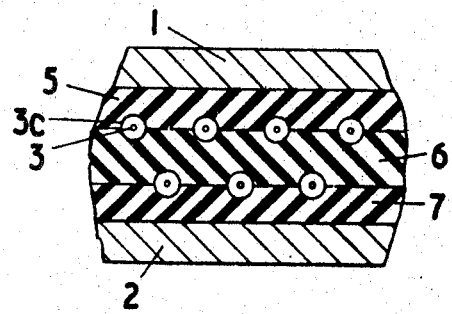
FIGURE 3 is a view similar to FIGURE 2 of a modified form of the invention.

FIGURE 3 shows part of a core tube 1 and an outer housing or shell 2, both of copper. A layer 5 of the insulating material (composition) is molded on the core tube 1, and when the layer has cured, a first winding or heater wire is wound onto the layer 5. The heater wire is in the form of an element wire 3 surrounded by a ceramic coating 3c. In the drawing the thickness of the ceramic coating is exaggerated for clarity of illustration. It is normally very thin. Apart from the form of the heater wires, the heater construction is similar to that described above. It is completed by a further layer of insulating material a second winding of heater wire and a layer 7 of insulating material.

It has been found that with an insulating layer of this type it is normally only necessary for a single winding to be arranged round the pressure head. However, since two standard voltages (28 volt and 115 volt) are in use, it is possible to provide a dual voltage pressure head by having one heater winding suitable for one voltage and the other winding for the second voltage. This gives the pressure head versatility and enables a reduction in the requirement for spares holding by airline operators. FIGURES 4, 5 and 6 show a dual voltage pressure head.

FIGURE 4 shows the pressure head with its core tube 1 and the outer shell 2. The pressure head is mounted on a heated mast 8 of aerofoil cross-section and provided with one or two mast heaters 9. The second heater is provided to increase the heating effect once the aircraft is in flight and the mast is subjected to a very low external ambient temperature. FIGURE 5 shows inner and outer windings 10 and 11 sandwiched between layers of sodium silicate composition insulating material. An electrical connector 12 is provided for making connections to the heaters 9 and the windings 10 and 11.

FIGURE 6 shows 115 v. and 28 v. heater windings for the pitot tube and mast. The winding 10 is a 28 volt winding constituting the inner winding of the pitot, the winding 11 is a 115 volt winding constituting the outer winding of the pitot, 13 is a 28 v. winding constituting the inner winding of the mast and 14 is a 115 v. winding constituting the outer winding of the mast.

One preferred sodium silicate composition which has given satisfactory results is:

| | Parts by weight |
|---|---|
| LQ/S6 filler by Fortafix Ltd. | 20 |
| LQ/S6 binder by Fortafix Ltd. | 18 |
| DT O76 filler by Ciba Ltd. | 3 |

The precise composition of LQ/S6 filler and binder is not known to me but I do know that they are blends of sodium and potassium silicates and inert fillers. DT O76 is a proprietary inert thixotropic filler.

The DT O76 could be replaced by marble flour, sand, silica flour, mica flour, slate powder, zircon powder or chopped glass strands.

Various modifications may be made within the scope of the invention.

I claim:
1. In an aircraft pressure head comprising a rigid tube adapted to project from an airframe into the air stream the improvement consisting in that said rigid tube comprises an outer housing of high thermal conductivity metal and an inner metal core coaxial to said outer housing and radially spaced therefrom so as to define an annular cavity; a molded sheath of a sodium silicate composition filling said annular cavity; and at least one electrical heating element completely embedded in said sheath.

2. The structure of claim 1, wherein said outer housing and core are of copper.

3. The structure of claim 1 in which said inner metal core is of stainless steel.

4. The structure of claim 1, wherein said composition has a filler to enhance its temperature resistance.

5. The structure of claim 1 in which said heating element is of wire which is wound helically so as to start and finish at the same end of the pressure head.

6. The structure of claim 5 in which said molded sheath comprises three coaxial layers and the helical winding comprises two coaxial parts, the inner part of said winding being embedded between the first and second layers, and the outer part of said winding being embedded between the second layer and the third layer.

7. The structure of claim 1, wherein said heating element is a heating wire coated with a thin layer of ceramic material.

8. The structure of claim 1, wherein two electrical heating elements are embedded in said molded sheath, each being in the form of a winding of heating wire, and being alternatively usable with different standard voltages.

References Cited

UNITED STATES PATENTS

| 1,881,722 | 10/1932 | Lee | 219—205 |
| 2,160,968 | 11/1936 | Beck et al. | 338—230 X |
| 2,067,102 | 1/1937 | Simon | 219—205 X |
| 2,510,986 | 6/1950 | Larkin | 73—212 |
| 2,300,654 | 11/1942 | Daiber | 73—212 |
| 2,535,268 | 12/1950 | Coats | 338—268 X |
| 2,984,107 | 5/1961 | Strieby et al. | 73—212 |

FOREIGN PATENTS

| 538,584 | 3/1957 | Canada. |

JOSEPH V. TRUHE, Primary Examiner

C. L. ALBRITTON, Assistant Examiner

U.S. Cl. X.R.

73—212; 219—544, 548